United States Patent
Viola et al.

[11] Patent Number: 5,732,808
[45] Date of Patent: Mar. 31, 1998

[54] CLUTCH MODULE HAVING A FLYWHEEL WITH VENTILATING FINS

[75] Inventors: Paolo Viola, Paris; Michelle Sevennec, Sainte Gemme, both of France

[73] Assignee: Valeo, Cedex, Paris, France

[21] Appl. No.: 481,468

[22] PCT Filed: Nov. 10, 1994

[86] PCT No.: PCT/FR94/01319

§ 371 Date: Jul. 10, 1995

§ 102(e) Date: Jul. 10, 1995

[87] PCT Pub. No.: WO95/13486

PCT Pub. Date: May 18, 1995

[30] Foreign Application Priority Data

Nov. 10, 1993 [FR] France .................... 93 13431

[51] Int. Cl.$^6$ .................... F16D 13/72
[52] U.S. Cl. .................... 192/70.12; 192/113.23
[58] Field of Search .................... 192/70.12, 113.23; 403/337

[56] References Cited

U.S. PATENT DOCUMENTS

| | | | |
|---|---|---|---|
| 2,205,629 | 6/1940 | Peterson | 192/70.12 X |
| 3,499,512 | 3/1970 | Maurice | |
| 3,661,238 | 5/1972 | Davies | 192/70.12 X |
| 4,657,128 | 4/1987 | Fujito et al. | 192/70.12 X |
| 4,776,443 | 10/1988 | Maruyamano et al. | 192/70.12 |
| 4,923,043 | 5/1990 | Okuno | 192/70.12 |
| 4,947,973 | 8/1990 | Takeuchi | 192/70.12 |
| 4,989,709 | 2/1991 | Takeuchi | 192/70.12 |
| 5,072,816 | 12/1991 | Takeuchi et al. | 192/70.12 |
| 5,172,608 | 12/1992 | Schultz et al. | 403/337 X |

FOREIGN PATENT DOCUMENTS

| | | |
|---|---|---|
| 75387 | 3/1983 | European Pat. Off. |
| 1524350 | 5/1968 | France . |
| 1066876 | 10/1959 | Germany . |
| 853356 | 11/1960 | United Kingdom . |
| 9102909 | 3/1991 | WIPO . |

Primary Examiner—Charles A. Marmor
Assistant Examiner—Saél J. Rodriguez
Attorney, Agent, or Firm—Longacre & White

[57] ABSTRACT

A clutch module is of the kind comprising a mechanism (11), a clutch friction wheel (12) and a flywheel (13), the mechanism (11) itself comprising a cover plate (14) by which it is attached on the flywheel (13), a diaphragm (15) which bears on the cover plate (14), and a pressure plate (16) on which the diaphragm (15) bears. According to the invention, in the vicinity of its periphery having the larger diameter, the flywheel (13) carries ventilating fins (58,58') projecting axially from its front face, that is to say from its surface facing towards the pressure plate (16).

2 Claims, 2 Drawing Sheets

CLUTCH MODULE HAVING A FLYWHEEL WITH VENTILATING FINS

BACKGROUND OF THE INVENTION a) Field of the Invention

This invention relates to clutch modules, especially for motor vehicles.

b) Description of Related Art

As is known, a clutch module includes, in a unitary manner, a mechanism, a clutch friction wheel and a flywheel, the mechanism itself comprising a cover plate by which it is secured on the flywheel, a diaphragm which bears on the cover plate, and a pressure plate on which the diaphragm bears.

Lying between the pressure plate and the flywheel, the space in which the friction liners of the friction disc that forms part of the clutch friction wheel are disposed is usually very confined, and the disadvantage can result that there is a risk of over-heating of one and/or the other of the components concerned.

SUMMARY OF THE INVENTION

An object of the invention is to provide a clutch module of this kind in which ventilation is improved in order to reduce this risk, and which also has other advantages.

The said clutch module is characterised in that, in the vicinity of its periphery having the larger diameter, the flywheel carries ventilating fins projecting axially on its front surface, that is to say its surface that faces towards the pressure plate, and in that the said ventilating fins extend radially beyond the friction disc of the clutch friction wheel, in line with the friction liners of the said friction disc.

The said ventilating fins are located in alignment with the friction liners of the friction disc of the clutch friction wheel, with the friction liners, and the friction surfaces with which they cooperate, having the benefit of being swept by an airstream which is set up, in use, between the ventilating fins and apertures which are also formed for this purpose in the flywheel, and which, by evacuating heat, is particularly favourable for the cooling of the assembly.

In addition, the pressure plate having radial lugs which are connected by tongues to the cover plate of the mechanism, so as to couple it in rotation to the latter, while allowing it to undergo axial displacement with respect thereto, at least one of the ventilating fins, having a height which may be smaller than that of the others, is at least partly located axially in line with a said lug.

This ventilating fin thus has the additional advantage that it limits the axial course of travel of the pressure plate with respect to the flywheel, by offering an axial engagement surface to the pressure plate, which, by consequently limiting the possible wear in the friction liners of the friction disc of the clutch friction wheel, has the advantage that it avoids any risk of deterioration of the pressure plate and/or of the flywheel by the rivets which are normally provided for fastening the said friction liners on to the plate that carries them.

BRIEF DESCRIPTION OF THE DRAWINGS

The features and advantages of the invention will appear more clearly from the description which follows, by way of example, with reference to the attached diagrammatic drawings, in which.

DETAILED DESCRIPTION OF THE PREFERRED EMBODIMENT

Figure 1:
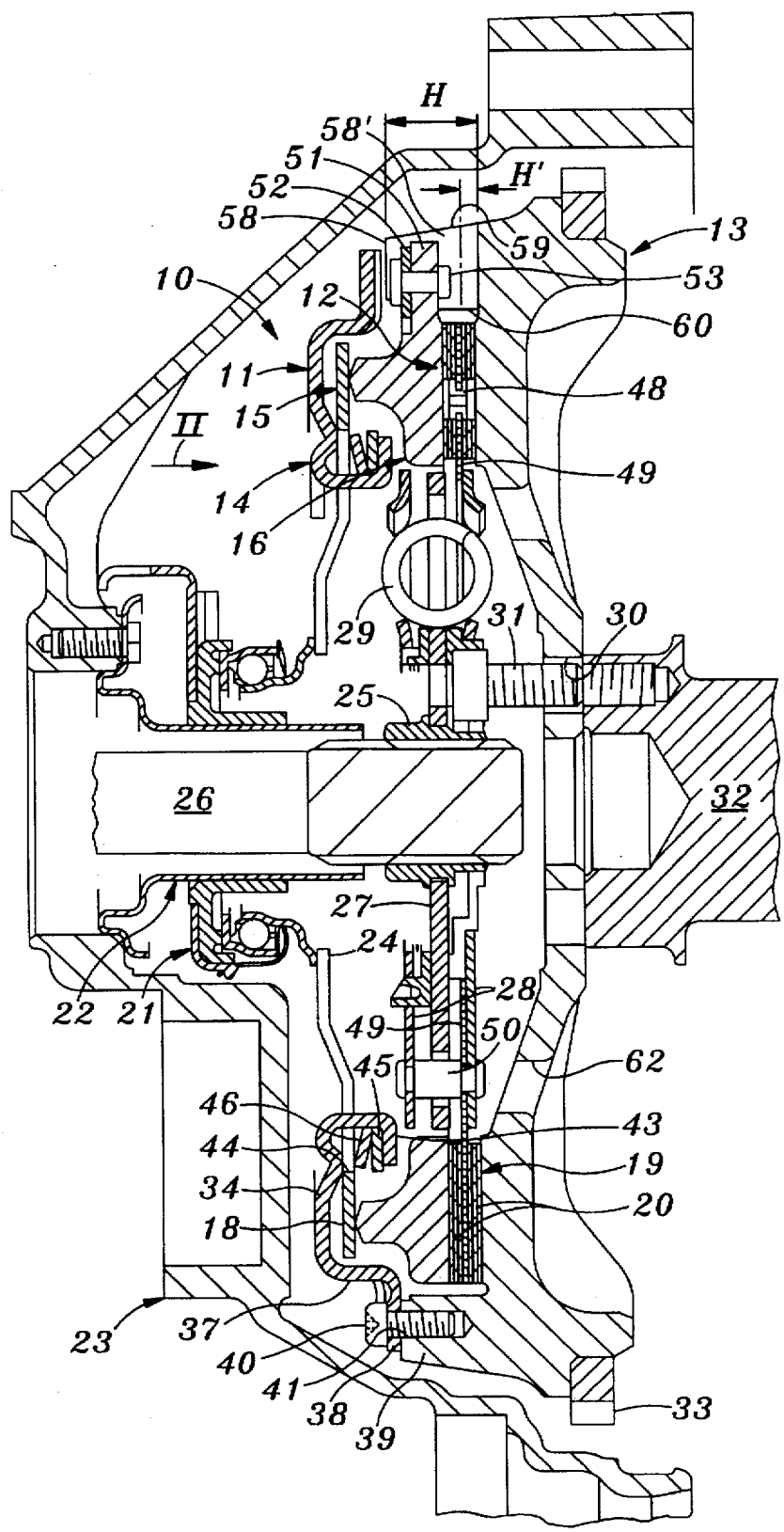
FIG. 1 is a view of a clutch module in accordance with the invention, in axial cross section taken on the broken line I—I in FIG. 2.

As is shown in the drawings, the clutch module 10 in accordance with the invention constitutes a unitary assembly and comprises, in axial succession and in a manner known per se, a mechanism 11, a clutch friction wheel 12, and a flywheel 13.

The mechanism 11 itself comprises, in axial succession, a cover plate 14 which is attached to the flywheel 13 as will be described later on herein, a diaphragm 15 which bears on the cover plate 14, and a pressure plate 16 on which the diaphragm 15 bears. In this example, the mechanism 11 is of the "push to release" type.

The diaphragm 15 accordingly bears on the cover plate 14 on the same side as the periphery, having the smaller diameter, of its peripheral portion 18 defining a Belleville ring, while it bears on the pressure plate 16 on the same side as the periphery of the latter having the larger diameter.

In a manner known per se, the pressure plate 16 has a divided annular projecting element (not given a reference numeral in FIG. 1), for engagement on it of the said peripheral surface 18 of the diaphragm.

Under the biassing action of the diaphragm 15, the pressure plate 16 is adapted to clamp, against the flywheel 13, the friction liners 20 of the friction disc 19 which is part of the clutch friction wheel 12.

Figure 2:
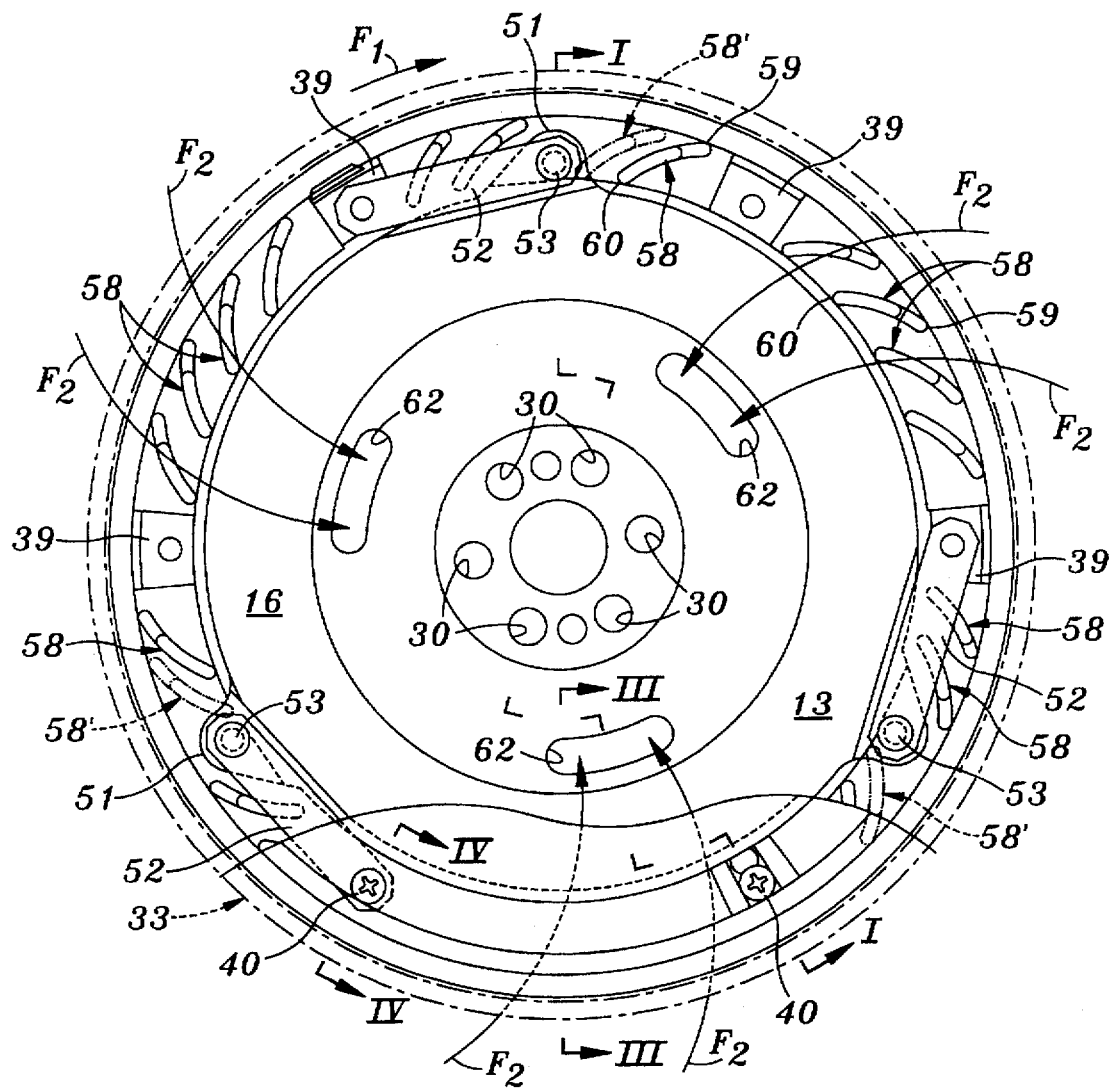
FIG. 2 is a plan view of the same, in the direction of the arrow II in FIG. 1, locally cut away so as essentially to leave only the pressure plate and the flywheel.
Figure 3:
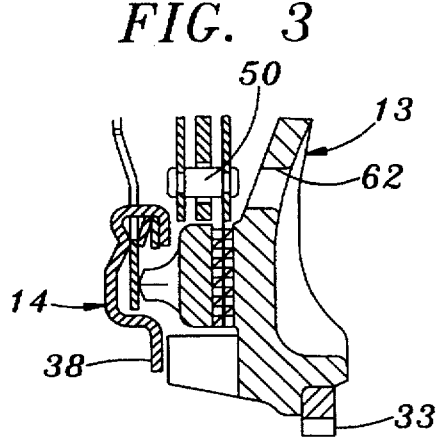
FIG. 3 is a partial view of the same, in axial cross section taken on the line III—III in FIG. 2.

For release of the said friction liners 20, and as is shown in fine lines in FIG. 2, a clutch release bearing 21 is provided, which, being mounted for axial sliding movement on a sleeve 22 which is fixed to the casing 23 of the assembly, is adapted to exert a thrust on the fingers 24 defined in the central part of the diaphragm 15.

In this example, the clutch friction wheel 12 is of the damped hub type.

Apart from a hub 25 by which it is adapted to be mounted in rotation on a driven shaft 26, namely the input shaft of a gearbox, and a damper plate 27, which is secured, in this example by seaming, to the hub 25, it includes two guide rings 28, each of which lies, respectively, on either side of the damper plate 27, with the friction disc 19 being fixed to them, and with, interposed circumferentially between the damper plate 27 and the said guide rings 28, circumferentially acting resilient means which in this example are springs 29 of the coil spring type, each of which is individually housed partly in a window of the damper plate 27 and partly in windows of the guide rings 28.

In this example, the friction liners 20 of the friction disc 19 are attached by means of rivets 48 on the plate 49 that carries them, and this plate 49 is fixed to one of the guide rings 28 by means of short bars 50 which secure the said guide rings 28 to each other.

In this example, the flywheel is of the integral type, being of a mouldable material and in this example a casting, as is the pressure plate 16.

In its central portion it has a plurality of apertures 30, spaced apart on a circle, for accommodating fastening screws 31 which enable the assembly to be attached on a driving shaft 32, namely the crankshaft of an internal combustion engine.

At its periphery it carries a starter crown 33. In this example, the cover plate 14 of the mechanism 11 is of press-formed sheet metal, and it includes a transverse, annular base portion 34 which in this example includes a press-formed bead 35 through which it provides a primary abutment for the peripheral portion 18 of the diaphragm 15, defining the Belleville ring.

In this example, for pivoting application of the diaphragm 15 to the cover plate 14, the cover plate 14 has lugs 43 which project integrally from its base portion 40, being formed by pressing and bending of the initial metal blank, and which pass through the diaphragm 15 via apertures 44, which are present at the root of its fingers 24 and provide a secondary abutment for the peripheral portion 18 of the said diaphragm 15 defining a Belleville ring, in alignment with the bead 35 of the cover plate 14, and in this example through an interposed spacer ring 45 and a resilient ring 46 having axial elasticity and being, in this example, of generally frusto-conical shape.

The cover plate 14 also includes a peripheral lateral wall 37 by means of which it surrounds the diaphragm 15, and which is in this example generally cylindrical with a circular profile in transverse cross section.

The cover plate 14 then includes a transverse flange 38 which extends radially away from the base portion 34, and through which it bears axially on the flywheel 13.

In this example the flywheel 13 has from place to place, in the vicinity of its periphery having the larger diameter, bosses 39 which project axially and integrally with it, and on which the cover plate 14 bears axially through its flange 38, being in this example attached on these bosses 39 by means of screws 40 which pass through holes 41 formed for this purpose in the flange 38.

In this example, there are six of these bosses 39. The pressure plate 16 here has, arranged from place to place on its periphery having the larger diameter, radial lugs 51 which are connected by tongues 52 to the cover plate 14, so as to secure the latter to it for rotation together, while allowing some axial displacement with respect to it.

In this example three lugs 51 are provided, each being located between two bosses 39 of the flywheel 13, and the tongues 52 extend tangentially between them and the flange 38 of the cover plate 14.

The tongues 52 are here attached by means of a rivet 53 to a lug 51 of the pressure plate 16 at one of their ends, while at the other end they are attached to the flange 38 of the cover plate 14 by means of a screw 40, which secures the cover plate 14 to a boss 39 of the flywheel 13.

Figure 4:
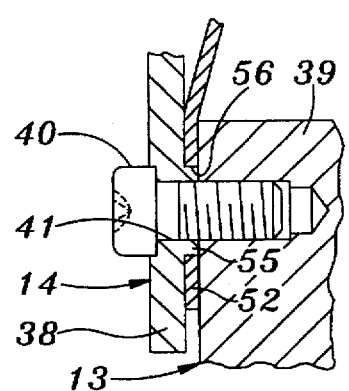
FIG. 4, which is on a larger scale, is another partial view of the same, in axial cross section taken on the line IV—IV in FIG. 2.

In the present case, FIG. 4, the flange 38 of the cover plate 14 defines, around each of the corresponding holes 41 and on the same side as the tongues 52, a boss 55 which is engaged in a hole 56 in the said tongues 52, and which thus ensures that the latter are both centred and secured.

In accordance with the invention, the flywheel 13 carries axially projecting ventilating fins 58 on its front face, that is to say on its surface facing towards the pressure plate 16, in the vicinity of its periphery having the largest diameter.

These ventilating fins 58 extend radially beyond the friction disc 19 of the clutch friction wheel 12, in line with the friction liners 20 of the friction disc 19.

In this example they are located on a circle between the bosses 39 of the flywheel 13, and they extend axially up to the immediate vicinity of the flange 38 of the cover plate 14.

Between those bosses 39 of the flywheel 13 between which there is no lug 51 of the pressure plate 16, there are in this example four ventilating fins 58, all having the same height H measured from the flywheel 13.

Between those bosses of the flywheel 13 between which a lug 51 of the pressure plate 16 does lie, the number of ventilating fins 58 is, in this example, reduced to three as is shown in full lines in the drawings, in order to leave a free passage for a said lug 51.

In this example the ventilating fins 58 are in this case located on a circle on either side of a said lug 51, with two of them on a first circumferential side of the latter and one on the opposite circumferential side.

However, in a modification, and as is indicated in broken lines in FIGS. 1 and 2, at least one ventilating fin 58' is at least partly located axially in line with at least one of the lugs 51 of the pressure plate 16, and,here, in line with each of the latter.

This ventilating fin 58' has an axial height H' which is smaller than the axial height H of the ventilating fins 58, so that it can be inserted under the corresponding lug 51 of the pressure plate 16, preferably surrounding the corresponding rivet 53.

With the possible exception of this ventilating fin 58', the ventilating fins 58 that are present between two bosses 39 of the flywheel 13 are spaced apart at regular intervals from each other on the circle.

Here, these ventilating fins 58, 58' all extend obliquely in the same direction with respect to a radial plane passing through their median zone.

In other words, their leading edge 59, which lies, in each case, on a common circumference of the assembly, is offset circumferentially with respect to their trailing edge 60, which itself lies on a common circumference of the assembly having a radius different from that of the aforementioned circumference.

If for example the direction of the clutch module 10, when in use in forward travel of the vehicle concerned, is the clockwise direction indicated by the arrow F1 in FIG. 2, the leading edge 55 of the ventilating fins 58, 58' is the one that extends over the circumference having the larger diameter, while their trailing edge 60 is the one that extends over the circumference having a smaller diameter.

In this example, between, firstly the holes 30 with which it is provided for its fastening to the driving shaft 32, and more precisely, for accommodating the fastening screws 31 which are provided for this fastening, and secondly the ventilating fins 58, 58' which it carries, the flywheel 13 has apertures 62 for facilitating a flow of air which generally goes, in operation, radially from the outside towards the inside, through the successive ducts delimited between them by the ventilating fins 58, 58' and the apertures 62, as indicated by the arrows F2 in FIG. 2.

In the present case three apertures 62 are provided, being spaced apart circumferentially, and these are all elongated like buttonholes along a common pitch circle of the assembly.

The division of the projecting element of the pressure plate, mentioned above, does of course facilitate the flow of air.

The present invention is of course not limited to the embodiment described and shown, but embraces all modified embodiments.

In particular, instead of being in one piece, the flywheel could be in two parts.

In addition, instead of use being made of lugs formed integrally from the cover plate, the assembly means which attach the diaphragm pivotally to the cover plate may make use of small bars as is described, for example, in the document FR-A-1 524 350 (U.S. Pat. No. 3,499,512).

We claim:

1. A clutch module comprising a mechanism (11), a clutch friction wheel (12) and a flywheel (13), said mechanism (11) comprising a cover plate (14) by which said mechanism is attached on the flywheel (13), a diaphragm (15) which bears on the cover plate (14), and a pressure plate (16) on which the diaphragm (15) bears, characterized in that, in a vicinity of its periphery having the larger diameter, the flywheel (13) carries first and second ventilating fins (58, 58') projecting axially on its surface facing towards the pressure plate (16), and in that said ventilating fins (58, 58') extends radially beyond the friction disc (19) of the clutch friction wheel (12), in line with the friction liners (20) of the said friction disc (19), wherein the pressure plate (16) comprises radial lugs (51) which are connected by tongues (52) to the cover plate (14), so as to couple said pressure plate in rotation to the cover plate, while allowing said pressure plate to undergo axial displacement with respect thereto, the first ventilating fins (58) carried by the flywheel (13) are located on a circle on either side of the said lugs (51), and at least one of said second ventilating fins (58') is at least partly located axially in line with at least one of said radial lugs (51).

2. A clutch module according to claim 1, wherein the second ventilating fins (58') have an axial height which is smaller than the axial height of the first ventilating fins (58).

* * * * *